(12) United States Patent
Stigler

(10) Patent No.: US 7,055,784 B2
(45) Date of Patent: Jun. 6, 2006

(54) RETAINING CLIP FOR FIXING AT LEAST ONE LINE TO A SUPPORT

(75) Inventor: Mario Stigler, Schoeffengrund (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/481,468

(22) PCT Filed: Jun. 14, 2002

(86) PCT No.: PCT/EP02/06597

§ 371 (c)(1),
(2), (4) Date: May 26, 2004

(87) PCT Pub. No.: WO03/001100

PCT Pub. Date: Jan. 3, 2003

(65) Prior Publication Data

US 2004/0188571 A1    Sep. 30, 2004

(30) Foreign Application Priority Data

Jun. 21, 2001    (DE) ................................ 101 29 841

(51) Int. Cl.
*F16L 3/12*    (2006.01)
(52) U.S. Cl. .................... 248/74.1; 248/74.3; 248/68.1; 248/229.1; 248/229.17; 24/229; 24/16 PB; 24/16 R
(58) Field of Classification Search ............... 248/68.1, 248/74.1, 74.2, 74.3, 70, 229.1, 231.81, 62, 248/71, 230.8, 67.7; 24/339, 20 TT, 484, 24/16 R, 16 PB; 174/48, 68.3, 72 A, 100, 174/101, 148, 158 R, 163 R
See application file for complete search history.

(56) References Cited

U.S. PATENT DOCUMENTS

| | | | | |
|---|---|---|---|---|
| 973,532 | A | * 10/1910 | McLaughlin | ............... 24/20 TT |
| 3,090,826 | A | * 5/1963 | Cochran | ................. 174/158 R |
| 3,913,187 | A | * 10/1975 | Okuda | ......................... 24/484 |
| 4,128,220 | A | * 12/1978 | McNeel | ....................... 248/60 |
| 5,159,728 | A | * 11/1992 | Bingold | .................... 24/16 PB |

(Continued)

FOREIGN PATENT DOCUMENTS

DE    37 08 864    9/1988

(Continued)

*Primary Examiner*—Kimberly Wood
(74) *Attorney, Agent, or Firm*—Miles & Stockbridge P.C.

(57) ABSTRACT

A retaining clip (1) is described, for fastening at least one line (2), such as an electric line, fuel line, brake line or the like, to a support (3). To said end, the retaining clip (1) comprises at least one bearing region (4) for the line (2) and one retaining region (5) for attachment to the support (3). The retaining region (5) is formed according to the invention by a base part (6) and a closure part (7), wherein the latter is preferably at least in sections of a strip-like construction.

The invention is particularly suitable for fastening lines (2) to supports (3) in motor vehicles without the support (3) having to have a special fastening structure such as a hole or stud, i.e. the support itself may be, for example, a brake or fuel line already installed in the motor vehicle.

7 Claims, 2 Drawing Sheets

U.S. PATENT DOCUMENTS

| | | | | |
|---|---|---|---|---|
| 5,257,768 A | * | 11/1993 | Juenemann et al. | 248/604 |
| 5,538,208 A | * | 7/1996 | Cordes et al. | 248/69 |
| 5,669,590 A | * | 9/1997 | Przewodek | 248/68.1 |
| 5,806,819 A | * | 9/1998 | Martone | 248/230.1 |
| 5,937,488 A | | 8/1999 | Gerard | |
| 5,966,781 A | | 10/1999 | Gerard | |
| 6,164,605 A | * | 12/2000 | Drake et al. | 248/74.3 |
| 6,364,257 B1 | * | 4/2002 | Holder | 248/74.3 |
| 6,367,118 B1 | * | 4/2002 | Berfield | 15/323 |
| 6,523,231 B1 | * | 2/2003 | Lassiter | 24/339 |
| 6,533,226 B1 | * | 3/2003 | Geiger | 248/74.3 |
| 2005/0022344 A1 | * | 2/2005 | Igarashi | 24/16 PB |

FOREIGN PATENT DOCUMENTS

| | | | |
|---|---|---|---|
| EP | 0 483 635 | | 5/1992 |
| EP | 0642971 A1 | * | 3/1995 |
| EP | 642971 A1 | * | 3/1995 |
| EP | 999110 A2 | * | 5/2000 |
| EP | 1036966 A1 | * | 9/2000 |

* cited by examiner

RETAINING CLIP FOR FIXING AT LEAST ONE LINE TO A SUPPORT

The present invention relates to a retaining clip, in particular for fastening at least one line such as an electric line, fuel line, brake line or the like to a support, comprising at least one bearing region for the line and one retaining region for attachment to the support.

It is known to use retaining clips, in particular made of plastics material, to fasten elongate articles such as, for example, pipes, lines or cables to a support or to a structure. Such retaining elements are used in particular to attach fuel lines, brake lines or electric lines. In automotive engineering large numbers of such retaining elements are used. Numerous embodiments of such retaining elements are described, for example, in DE 37 08 864 C2 or in EP 0 483 635 B1.

Depending on the nature of the desired mechanical tensile strength of the fastening, the lines and/or the support are partially or entirely surrounded by structures of the retaining clips, wherein retaining elements particularly subject to tensile loads mostly have the property of being detachable only with difficulty and easily detachable clips mostly have the property of a relatively low tensile strength.

For fastening an article such as a line to a support a particular structure, such as, for example, a stud or a hole, is needed on the support so that the mounting of an article on a support mostly entails additional working steps.

Against said background, the object of the invention is to indicate a device for fastening a line to a support or to an already fastened line, which device allows, on the one hand, easy fastening of the line and, on the other hand, high mechanical stability under tensile stress. In particular, however, the device is to require no special structures on the support even when the latter, for example, because of closely adjacent components, is not accessible from all sides for mounting purposes.

The retaining clip according to the invention for fastening at least one line to a support, comprising at least one bearing region for the line and one retaining region for attachment to the support, is notable for the fact that the retaining region comprises a base part and a closure part. With said clip arrangement, fastening of a line to a support is advantageously possible in a simple manner because the line is fastenable directly to the support and additional structures such as a drill hole or stud are rendered superfluous.

The lines to be fastened are preferably at least one electric line, fuel line, brake line or the like. In motor vehicles, for example, such lines are found at many points. Besides cross-ties, struts or the like it is therefore possible in particular for such lines themselves also to serve as supports for fastening further lines or articles.

In a first refinement of the device, the retaining clip in its retaining region has a geometry adapted to the support cross-section, with the result that in an advantageous manner a secure fixing of the retaining clip on the support is guaranteed and the positioning accuracy is increased.

In an advantageous development of the invention, the base part and/or closure part comprises damping structures, which reduce the transmission of mechanical vibrations between line and support. Both the transmission of vibrations of the line to the support and the transmission of vibrations of the support to the line are reduced. This is preferably achieved in that the damping structures are made of a flexible material and/or comprise flexible elements, which are capable of resiliently absorbing relative movements between line and support.

In a further advantageous refinement of the invention, base part and closure part are in the simplest case connected to one another by a hinge. The connection by a hinge enables a closure, by means of which the fastening and optionally a releasing of the article may be effected.

According to the invention in a preferred manner base part and closure part moreover comprise means of latching when in defined relative angular positions; for example, in such a way that either the base part or closure part has at least one latching nose and the other part has at least one latching groove cooperating with the latching nose. The latching means define relative angular positions for stable latching between base part and closure part and prevent unintended or undesired release of the fastening.

Alternatively or in addition to the proposed hinge, the closure part of the retaining clip is at least in sections of a narrow and/or strip-like construction. Solely by means of such a strip-like construction, which to said extent is reminiscent of a cable coupler, a flexibility is achieved which also makes it possible to dispense with the use of a hinge. As an important advantage, the strip-like construction allows retaining clips of said type to be fastened to supports of differing cross-sectional geometry and diameter. Furthermore, retaining clips with a strip-like closure part may advantageously be mounted also on supports not accessible from all sides and/or fastened to supports which, for example, because of adjacent components, leave hardly any or only limited free space for assembly. In other words, fastening is feasible wherever it is possible to pass the strip-like closure part behind the support. Finally, mounting of the strip-like closure part under tension advantageously reduces slipping of the fastening in the event of vibrations.

The flexibility is increased when the closure part at least in one portion is manufactured from a flexible material, such as, for example, non-rigid plastics material. The advantage of such a closure part lies particularly in the ability resiliently to absorb, for example, tensile loads.

In yet a further special refinement of the invention, base part and/or closure part comprise friction structures, which additionally counteract unintended slipping of the fastening as a result of vibrations.

According to a preferred development of the invention, base part and closure part comprise a cooperating barbed structure, which cooperate with the respective counterpart structure such as to produce between support and retaining region a connection which is easy to assemble and is then stable under tensile load.

In an advantageous refinement of the invention, the retaining clip is manufactured from plastics material, wherein the closure part is formed, preferably with the aid of a two-component injection moulding technique, on one end of the base part so that they are non-detachably connected yet movable relative to one another. Said technique has the advantage that closure part and base part may be manufactured as a coherent part in a production line, thereby eliminating a subsequent assembly step.

BRIEF DESCRIPTION OF THE DRAWINGS

Further advantageous refinements and details of the invention are described with reference to the embodiments which are illustrated in the drawings. The invention is however not restricted to said embodiments as numerous modifications, in particular of the special structures and the geometry of the clip, are possible without altering the essential content of the invention.

The Drawings Show Schematically.

DETAILED DESCRIPTION OF THE INVENTION

Figure 1:
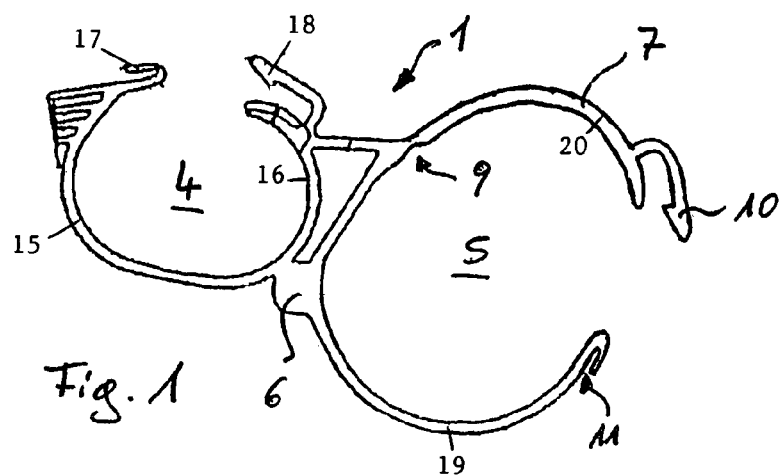
FIG. 1 a front view of a first embodiment of a retaining clip according to the invention, in which a base part and a closure part are connected to one another by a hinge.

FIG. 1 shows a front view of a first embodiment of a retaining clip 1 according to the invention for fastening at least one line 2 to a support 3. The retaining clip 1 comprises a bearing region 4 for the line 2 and a retaining region 5 for attachment to the support 3, wherein the retaining region 5 is formed by a base part 6 and a closure part 7, which are connected to one another by a hinge 9. Bearing region 4 and retaining region 5 preferably have a geometry adapted to the cross-section of the embraced articles (lines 2 and support 3 respectively) (cf. FIG. 5). While a latching groove 11 is formed, for example, on the base part 6, the closure part 7 has a corresponding latching nose 10, which in a defined relative angular position latch one into the other and embrace the support 3. As is evident from the drawings, the bearing region 4 for the lines 2 may be closed likewise by means of corresponding latching means.

Figure 2:
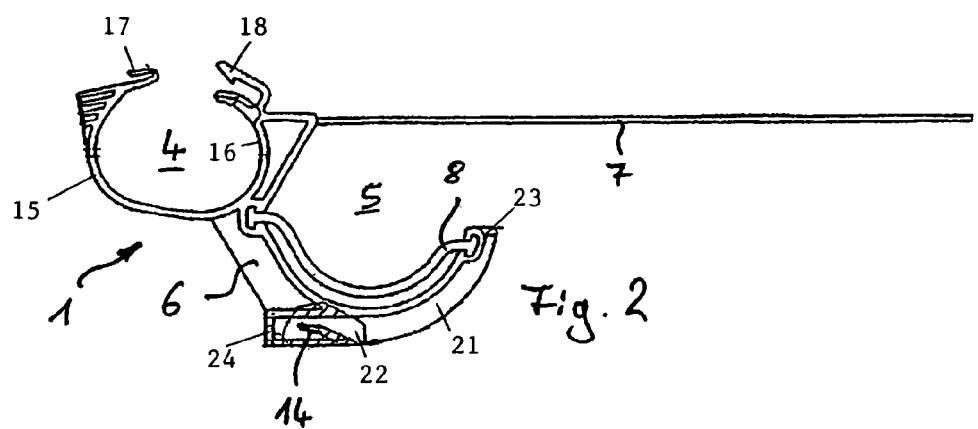
FIG. 2 a front view of a further embodiment of a retaining clip according to the invention, in which a closure part at least in sections is of a strip-like construction.

FIG. 2 shows a front view of an alternative embodiment of a retaining clip 1 according to the invention, in which the closure part 7 at least in sections is of a strip-like construction. While the closure part 7 has a barbed structure 13 (see FIG. 4), in the base part 6 at least one corresponding barb 14 is formed (cf. also FIG. 3). Said barb-like constructions 13, 14 advantageously result in a durable holding device which is stable under tensile load. Damping structures 8 moreover advantageously isolate the transmission of vibrations both from the support 3 to a line 2 fastened by means of the retaining clip 1 and, conversely, from the line 2 to the support 3.

Figure 3:
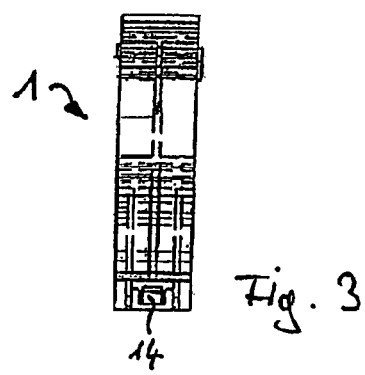
FIG. 3 the side view of the retaining clip according to FIG. 2.

FIG. 3 shows the side view of the retaining clip according to FIG. 2.

Figure 4:
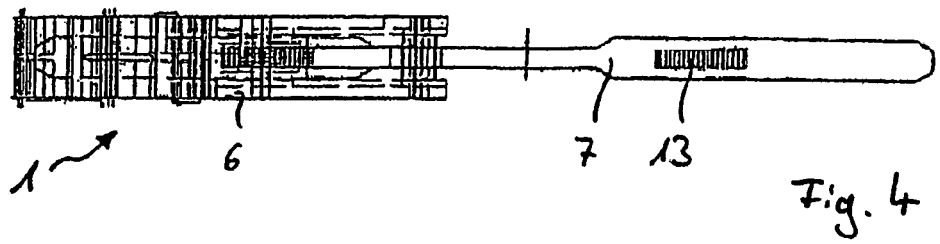
FIG. 4 the plan view of the retaining clip according to FIG. 2.

FIG. 4 shows the plan view of the retaining clip according to FIG. 2.

Figure 5:
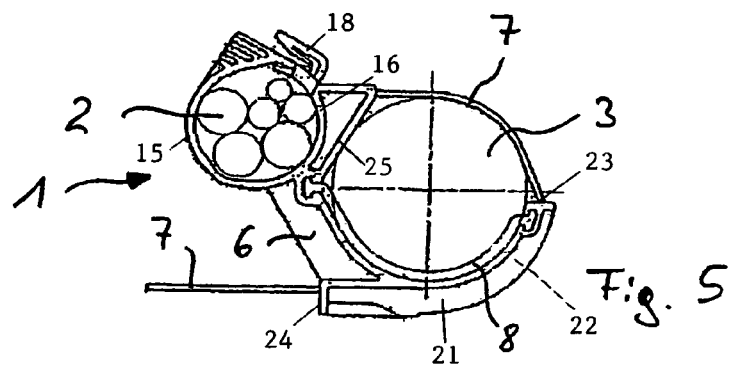
FIG. 5 the front view of the retaining clip according to FIG. 2 with closed positions.

FIG. 5 shows the front view of the retaining clip according to FIG. 2 with closed positions. In a clearly visible manner a plurality of lines 2, for example, electric lines, extend in the bearing region 4, while base part 6 and closure part 7 of the retaining region 5 embrace a single support 3 which may be, for example, a cross-tie, a strut or even a line, for example, a brake or fuel line.

Figure 6:
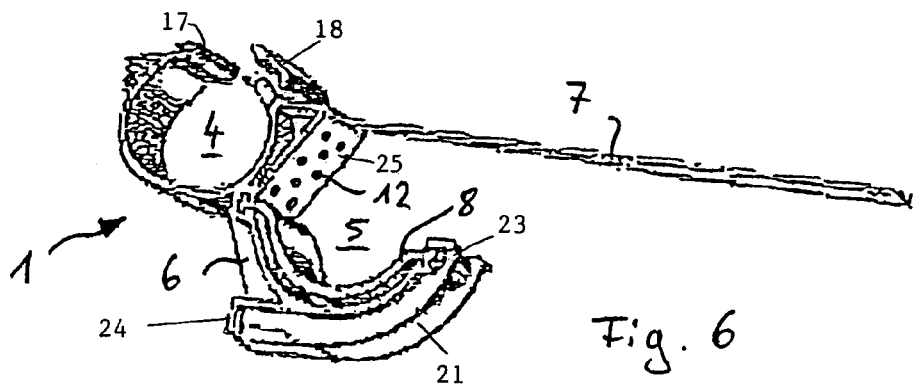
FIG. 6 a perspective view from the front of the retaining clip according to FIG. 2.

FIG. 6 shows a perspective view from the front of the retaining clip according to FIG. 2 having friction structures 12, such as, for example, burls 12, small barbs or other types of surface roughness which may be provided on the base part 6 and/or on the closure part 7 (not shown), to increase the friction. Said measure advantageously prevents displacement of the retaining clip 1 relative to the support 3 by an external influence, for example, under the action of vibrations.

The invention is particularly suitable for fastening lines 2 to supports 3 in motor vehicles without the support 3 having to have a special fastening structure such as a hole or stud, i.e. the support itself may be, for example, a brake or fuel line already installed in the motor vehicle.

Describing the embodiment of FIG. 1 with greater particularity, the bearing region 4 defines a first clip member mounted on the base 6 and having a pair of arms with free ends, one of the arms being fixed to the base, as shown, and the other arm being movable relative to the one arm so that the free ends of the arms are movable toward and away from one another. The first clip member has cooperable fastening elements 17, 18 for holding the free ends together, and the first clip member is constructed to surround at least one line when the free ends of the arms are held together.

The retaining region 5 defines a second clip member for mounting the first clip member on a support, and including a pair of arms 19, 20 with free ends, one of the arms 19 being fixed to the base 6, as shown, and the other arm 20 being movable relative to the one arm, by means of a hinge 9, 50 that the free ends of the arms of the second clip member are movable toward and away from one another. The second clip member has fastening elements 10 and 11 for holding the free ends together. The second clip member is constructed to surround a support when the free ends of the arms of the second clip member are held together.

Describing the embodiment of FIGS. 2–6 with greater particularity, the bearing region 4 defines a first clip member mounted on the base 6 and having a pair of arms 15, 16 with free ends that are movable toward and away from one another. The first clip member has cooperable fastening elements 17, 18 for holding the free ends of the arms together, and is constructed to surround at least one line 2 when the free ends of the arms are held together, as shown in FIG. 5.

The retaining region 5 defines a second clip member for mounting the first clip member on a support 3. The second clip member has a first part 21 cantilevered on the base 6, as shown in FIGS. 2, 5 and 6, and including a channel 22 and a support-engaging surface (e.g., damping structure 8). The channel has an entrance 23 remote from the base 6 and an exit 24 adjacent to the base. The second clip member also has a second part including an elongated flexible strip 7 connected to the base 6 at a location spaced from the support-engaging surface 8 and dimensioned for insertion into entrance 23 of the channel, through the channel, and out of the exit 24 as shown in FIG. 5. The support-engaging surface is disposed to engage a side portion of the support 3 opposite to another side portion of the support engaged by the strip 7 where the strip 7 extends from the base 6 to the entrance 23 of the channel 22 remote from the base, as shown in FIG. 5. The channel and the strip have cooperable coupling elements 13, 14 for retaining the strip in the channel. The base has a support-engaging portion 25 disposed to engage a side portion of the support between the channel and the strip, as shown in FIG. 5, and, as described earlier, at least one of the support-engaging portion of the base and the strip has friction-increasing elements 12 thereon. The strip 7 is less rigid than the base 6 so that it can change from the shape shown in FIGS. 2 and 6 to the shape shown in FIG. 5 as it is wrapped about support 3 and extended through channel 22.

The invention claimed is:

1. A retaining clip for attaching at least one line to a support, comprising:
    a base;
    a first clip member mounted on the base for receiving at least one line and having a pair of arms attached to the base with free ends that are movable toward and away from one another between a predetermined opened position and a predetermined closed position, the first clip member having cooperable fastening elements for holding the free ends of the arms together in the closed position and being constructed to surround the at least one line when the free ends of the arms are held together; and
    a second clip member for mounting the first clip member on a support, the second clip member having a first part cantilevered from the base and including a channel with an entrance and an exit, the entrance being spaced remotely from the base and the exit being adjacent to the base, and a support-engaging surface, the second clip member also having a second part that includes an elongated flexible strip connected to the base at a location spaced from said support-engaging surface and being dimensioned for insertion into the entrance of the channel, through the channel, and out of the exit of the channel, the support-engaging surface being disposed to engage a side portion of the support opposite to another side portion of the support engaged by the strip where the strip extends from the base to the entrance of the channel, the flexibility of the strip being such that the strip can change shape as it extends from the base to the entrance of the channel, the channel and the strip having cooperable coupling elements for retaining the strip in the channel.

2. A retaining clip according to claim 1, wherein the base has a support-engaging portion disposed to engage a side portion of the support between the channel and the strip.

3. A retaining clip according to claim 1, wherein at least one of the support-engaging portion of the base and the strip has friction increasing elements thereon.

4. A retaining clip according to claim 1, wherein the cooperable fastening elements for holding the free ends of the arms together include a groove and a nose located on respective free ends of the arms.

5. A retaining clip for attaching at least one line to a support, comprising:
    a base;
    a first clip member mounted on the base for receiving at least one line and having a pair of arms with free ends that are movable toward and away from one another, the first clip member having cooperable fastening elements for holding the free ends of the arms together and being constructed to surround the at least one line when the free ends of the arms are held together; and
    a second clip member for mounting the first clip member on a support, the second clip member having a first part cantilevered from the base and including a channel with an entrance and an exit, and a support-engaging surface, the second clip member also having a second part that includes an elongated flexible strip connected to the base at a location spaced from said support-engaging surface and being dimensioned for insertion into the entrance of the channel, through the channel, and out of the exit of the channel, the support-engaging surface being disposed to engage a side portion of the support opposite to another side portion of the support engaged by the strip where the strip extends from the base to the entrance of the channel remote from the base, the flexibility of the strip being such that the strip can change shape as it extends from the base to the entrance of the channel, the channel and the strip having cooperable coupling elements for retaining the strip in the channel,
    wherein the support-engaging surface of the second clip member is part of a damping element for reducing the transmission of mechanical vibrations between the at least one line and the support.

6. A retaining clip according to claim 1, wherein the channel is curved between the entrance thereto and the exit adjacent to the base, and the support-engaging surface is curved along the channel.

7. A retaining clip according to claim 1, wherein the rigidity of the strip is less than that of the base.

* * * * *